United States Patent
Cariño, Jr.

[11] Patent Number: 6,067,542
[45] Date of Patent: May 23, 2000

[54] PRAGMA FACILITY AND SQL3 EXTENSION FOR OPTIMAL PARALLEL UDF EXECUTION

[75] Inventor: Felipe Cariño, Jr., Arcadia, Calif.

[73] Assignee: NCR Corporation, Dayton, Ohio

[21] Appl. No.: 08/940,851

[22] Filed: Sep. 30, 1997

Related U.S. Application Data

[63] Continuation-in-part of application No. 08/546,101, Oct. 20, 1995, abandoned, which is a continuation-in-part of application No. 08/546,283, Oct. 20, 1995, Pat. No. 5,689,698, which is a continuation-in-part of application No. 08/546,466, Oct. 20, 1995, Pat. No. 5,930,786, which is a continuation-in-part of application No. 08/546,070, Oct. 20, 1995, which is a continuation-in-part of application No. 08/546,465, Oct. 20, 1995, Pat. No. 5,754,841, which is a continuation-in-part of application No. 08/546,059, Oct. 20, 1995, Pat. No. 5,864,843.

[51] Int. Cl.[7] .................................................. G06F 17/30
[52] U.S. Cl. .......................... 707/4; 707/104; 707/103; 707/102
[58] Field of Search .................................. 707/2, 3, 4, 7, 707/104, 102, 103; 395/708, 674

[56] References Cited

U.S. PATENT DOCUMENTS

| | | | |
|---|---|---|---|
| 5,325,525 | 6/1994 | Shan et al. | 395/674 |
| 5,504,894 | 4/1996 | Ferguson et al. | 707/2 |
| 5,754,841 | 5/1998 | Carino, Jr. | 707/3 |
| 5,765,147 | 6/1998 | Mattos et al. | 707/4 |
| 5,794,250 | 8/1998 | Carino, Jr. et al. | 707/104 |
| 5,799,310 | 8/1998 | Anderson et al. | 707/102 |
| 5,806,061 | 9/1998 | Chaudhuri et al. | 707/3 |
| 5,845,113 | 12/1998 | Swami et al. | 707/7 |
| 5,850,550 | 12/1998 | Li et al. | 395/708 |
| 5,857,180 | 1/1999 | Hallmark et al. | 707/2 |
| 5,864,843 | 1/1998 | Carino, Jr. et al. | 707/4 |
| 5,873,075 | 6/1997 | Cochrane et al. | 707/2 |
| 5,873,083 | 2/1999 | Jones et al. | 707/4 |
| 5,930,786 | 7/1999 | Carino et al. | 707/4 |
| 6,006,235 | 12/1999 | Macdonald et al. | 707/103 |

OTHER PUBLICATIONS

Sudhir R. Ahuja, et al. —"Multimedia Collaboration," *AT&T Technical Journal*, Sep./Oct. 1995, pp. 46–53.

Shaku Atre, et al. —"Data Distribution and Warehousing," *Enterprise Client/Server DBMS*, Oct. 1995, pp. 54–62.

Alexandros Biliris, et al., AT&T Bell Laboratories, Murray Hill, NJ 07974 —"A High Performance Configurable Storage Manager," *IEEE*, 1995, pp. 35–43.

Felipe Cariño, Jr., "HETERO—Heterogeneous DBMS Frontend", *Office Systems: Methods and Tools*, Elsevier Science Publishers B.V. (North–Holland), IFIP 1987, Oct. 1986, pp. 159–171.

Felipe Cariño, Jr., et al., "Industrial Database Supercomputer Exegesis—The DBC/1012, The NCR 3700, The Ynet™ and The BYNET™," *IEEE Computer Society Press*, Database Machine Exegesis, pp. 1–17 (no date).

Felipe Cariño, Jr., et al., "MOONBASE—A Complete Multimedia Database Solution," *ACM Multimedia Workshop on Multimedia Databases*, San Francisco, CA Oct. 21, 1994, 10 pages.

E. F. Codd, "A Relational Model of Data for Large Shared Data Banks," *Communications of the ACM*, vol. 13, No. 6, Jun. 1970, pp. 377–387.

(List continued on next page.)

*Primary Examiner*—Thomas G. Black
*Assistant Examiner*—Charles L. Rones
*Attorney, Agent, or Firm*—Gates & Cooper

[57] ABSTRACT

A method, apparatus, and article of manufacture for a computer implemented query optimizer. A query is to be executed containing user defined functions and abstract data type parameters to retrieve data from a database. Optimization information is received from a user. Then, the execution of the query is optimized based on the received optimization information for execution within a massively parallel, shared nothing architecture.

15 Claims, 10 Drawing Sheets

OTHER PUBLICATIONS

Michael R. Genesereth, et al., "Software Agents", *Communications of the ACM,* Special Issue on Intelligent Agents, vol. 37, No. 7, Jul. 1994, pp. 48–53.

Dr. Richard Hackathorn, "Data WAREHOUSING Energizes Your Enterprise," *Datamation,* Feb. 1, 1995, pp. 38–42.

Howard P. Katseff, et al., "Predictive Prefetch in the Nemesis Multimedia Information Service," *Proceedings of ACM Multimedia,* San Francisco, CA, Oct. 1994, pp. 201–209.

Nikos Koudas, et al., "Declustering Spatial Databases on a Multi–Computer Architecture," *Proceedings Extending Database Technology,* France, Mar. 1996, pp. 592–614.

Mary E.S. Loomis, Ph.D., "Moving Objects into Relational Systems," *Database World,* Boston, Jun. 14, 1993, pp. D5–1–D5–15.

W. O'Connell, et al., "A Teradata Content–Based Multimedia Object Manager for Massively Parallel Architectures," *ACM–SIGMOD,* Montreal, Canada, Jun. 1996, pp. 68–78.

William O'Connell, et al., "The Teradata SQL3 Multimedia Database Server," *Technology for Multimedia, IEEE Press,* Dec. 1996, pp. 217–252.

Warren Sterling, et al., "Multimedia Databases and Servers," *AT&T Tecnical Journal,* Sep./Oct. 1995, pp. 54–67.

Michael Stonebraker, "The Case for Shared Nothing," *IEEE Data Engineering Bulletin,* vol. 9, No. 2, 1986, pp. 4–9.

Michael Ubell, "The Montage Extensible DataBlade™ Architecture," *Proceedings of ACM–SIGMOD,* vol. 23, No. 2, Jun. 1994, p. 482.

Murali Venkatrao, et al., "SQL/CLI—A New Binding Style for SQL," *ACM–SIGMOD Record,* vol. 24, No. 4, Dec. 1995, pp. 72–77.

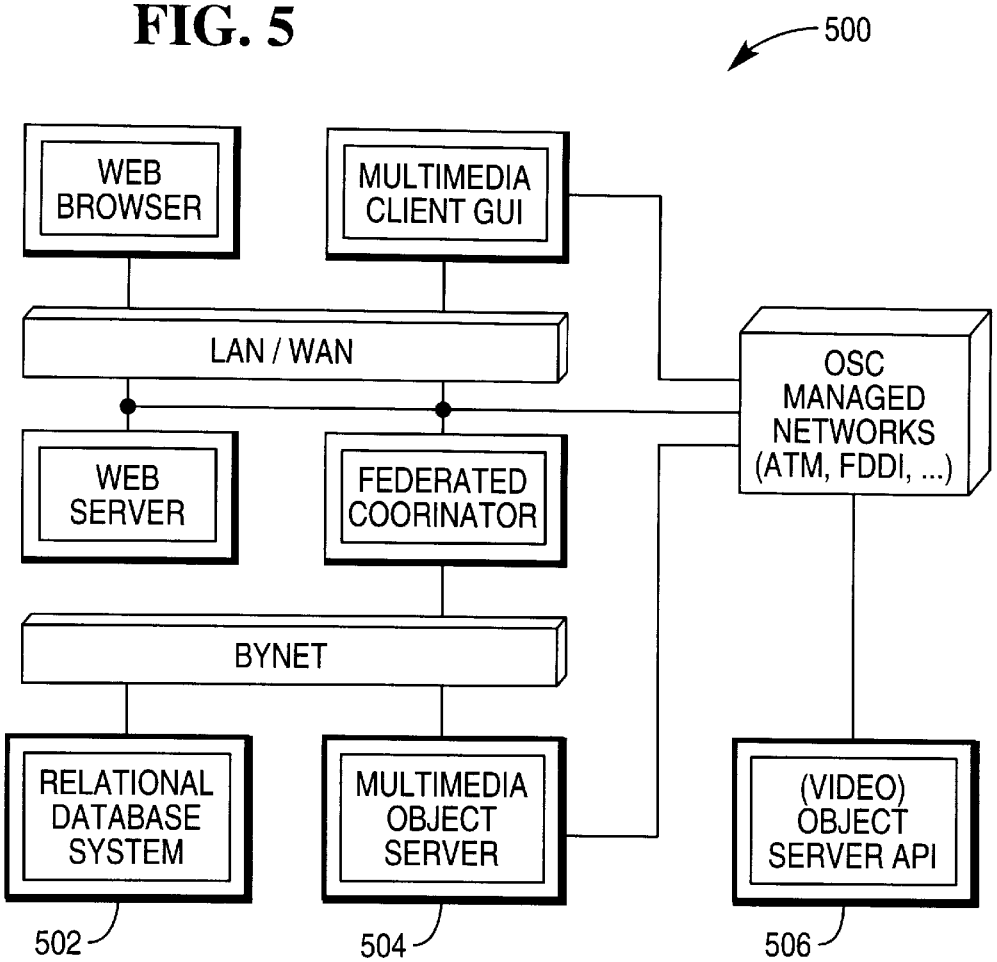

PRAGMA FACILITY AND SQL3 EXTENSION FOR OPTIMAL PARALLEL UDF EXECUTION

CONTINUATION-IN-PART

This application is a continuation-in-part from the following co-pending and commonly-assigned patent applications and shares at least one common inventor with each of the following applications:

Application Ser. No. 08/546,101, entitled "METHOD AND APPARATUS FOR EXTENDING EXISTING DATABASE MANAGEMENT SYSTEM FOR NEW DATA TYPES," filed on Oct. 20, 1995, by Felipe Cariño Jr. et al., abandoned;

Application Ser. No. 08/546,283 "METHOD AND APPARATUS FOR MANAGING SHARED DATA," filed on Oct. 20, 1995, by William P. Jones et al., now U.S. Pat. No. 5,689,698, issued on Nov. 18, 1997;

Application Ser. No. 08/546,466 "METHOD AND APPARATUS FOR PROVIDING SHARED DATA TO A REQUESTING CLIENT," filed on Oct. 20, 1995, herewith, by Felipe Cariño, Jr. et al., now U.S. Pat. No. 5,930,786, issued on Jul. 27, 1998;

Application Ser. No. 08/546,070, entitled "METHOD AND APPARATUS FOR PROVIDING ACCESS TO SHARED DATA TO NON-REQUESTING CLIENTS," filed on Oct. 20, 1995, by Felipe Cariño, Jr. et al., attorney's docket number 6543;

Application Ser. No. 08/546,465 "METHOD AND APPARATUS FOR PARALLEL EXECUTION OF USER-DEFINED FUNCTIONS IN AN OBJECT-RELATIONAL DATABASE MANAGEMENT SYSTEM," filed on Oct. 20, 1995, by Felipe Cariño Jr., now U.S. Pat. No. 5,754,841, issued on May 19, 1998;

Application Ser. No. 08/546,059, "METHOD AND APPARATUS FOR EXTENDING A DATABASE MANAGEMENT SYSTEM TO OPERATE WITH DIVERSE OBJECT SERVERS," filed on Oct. 20, 1995, by Felipe Cariño Jr. et al., now U.S. Pat. No. 5,864,843, issued on Jan. 26, 1999;

all of which applications are incorporated by reference herein.

BACKGROUND OF THE INVENTION

1. Field of the Invention

This invention relates in general to a system for executing a query, and in particular to enabling a user to optimize query execution.

2. Description of Related Art

Large-scale integrated database management systems provide an efficient, consistent, and secure means for storing and retrieving vast amounts of data. At the same time, information is being stored in new data formats. In particular, multimedia applications are being introduced and deployed for a wide range of business and entertainment purposes, including multimedia storage, retrieval, and content analysis.

Multimedia database information can be managed by a relational database management system (RDBMS), which stores data in tables. RDBMS software using a Structured Query Language (SQL) interface is well known in the art. The SQL interface has evolved into a standard language for RDBMS software and has been adopted as such by both the American National Standards Institute (ANSI) and the International Standards Organization (ISO). The SQL interface allows users to manipulate the data in the RDBMS through relational operations on the tables. Additionally, relational operations of the tables may be comprised of user defined functions.

However, RDBMS software does not effectively handle data in new data formats, such as multimedia objects, and do not optimize the execution of user defined functions. There is a need in the art to provide efficient processing of multimedia data in new data formats and of user-defined functions.

SUMMARY OF INVENTION

To overcome the limitations in the prior art described above, and to overcome other limitations that will become apparent upon reading and understanding the present specification, the present invention discloses a method, apparatus, and article of manufacture for a computer implemented query optimizer.

In accordance with this invention, a query is to be executed containing user defined functions and abstract data type parameters to retrieve data from a database. Optimization information is received from a user. Then, the execution of the query is optimized based on the received optimization information for execution within a massively parallel, shared nothing architecture. One object of the invention is to enable a user to provide information for optimizing a query in a massively parallel, shared-nothing architecture. Another object of the invention is to enable a user to override default execution options.

BRIEF DESCRIPTION OF THE DRAWINGS

FIG. 5 illustrates the multimedia database architecture of the present invention;

FIG. 6 illustrates a user interface that includes an icon that represents an ADT object;

DETAILED DESCRIPTION OF THE PREFERRED EMBODIMENT

In the following description of the preferred embodiment, reference is made to the accompanying drawings which form a part hereof, and which is shown by way of illustration a specific embodiment in which the invention may be practiced. It is to be understood that other embodiments may be utilized as structural changes may be made without departing from the scope of the present invention.

Hardware Environment

Figure 1:
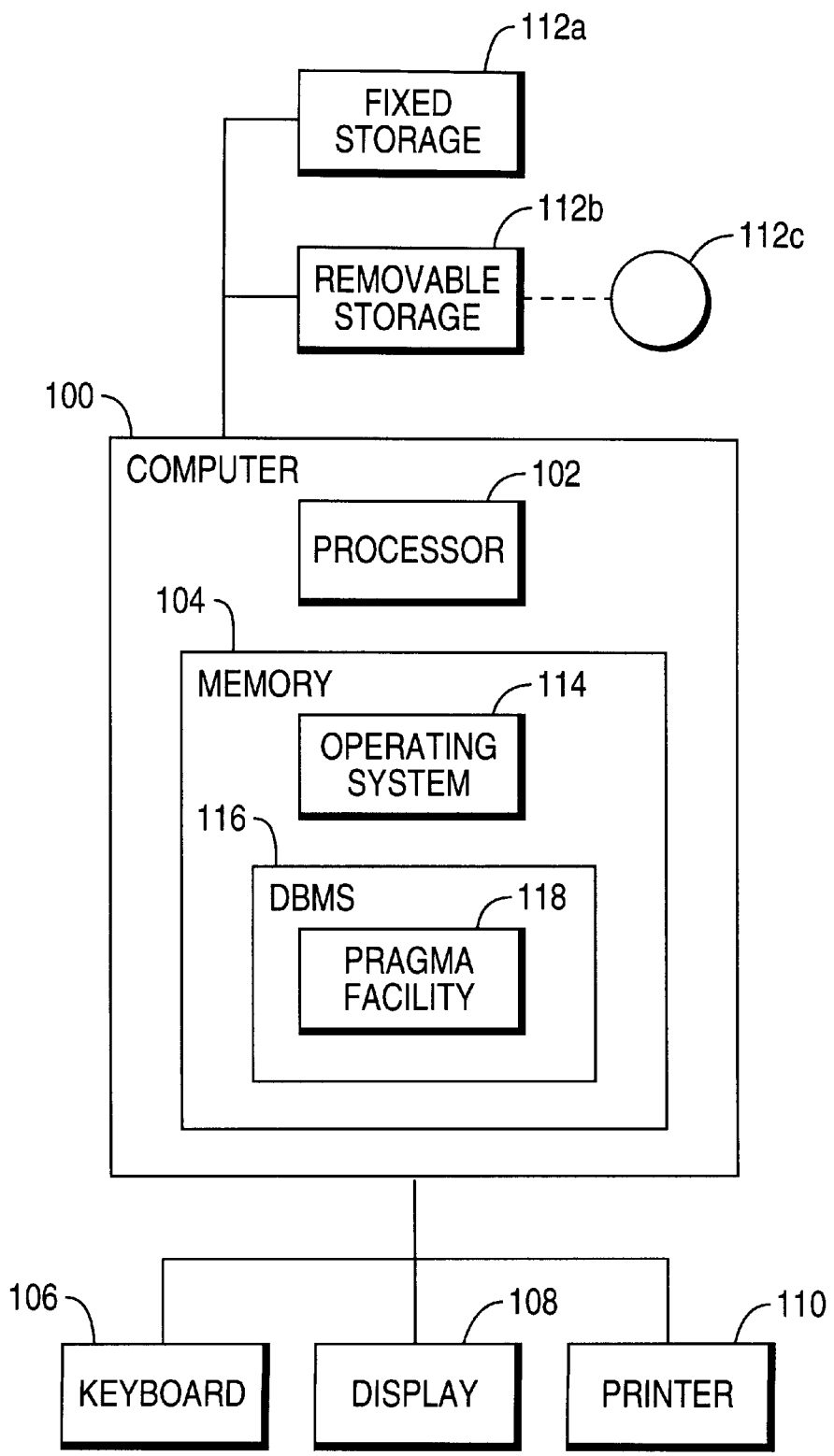
FIG. 1 is a block diagram illustrating an exemplary hardware environment used to implement the preferred embodiment of the present invention.

FIG. 1 is a block diagram illustrating an exemplary hardware environment used to implement the preferred embodiment of the present invention. In the exemplary hardware environment, a computer 100 may include, inter alia, a processor 102, memory 104, a keyboard 106, a display 108, a printer or plotter 110, may be connected locally or remotely to fixed and/or removable data storage devices 112a and 112b and their associated media 112c, and may be connected to data communications devices. The computer 100 also could be connected to other computer systems via the data communications devices. Those skilled in the art will recognize that any combination of the above components, or any number of different components, peripherals, and other devices, may be used with the computer 100.

The computer 100 operates under the control of an operating system (OS) 114, such as MVS®, AIX®, OS/2®, WINDOWS NT®, WINDOWS®, UNIX®, etc. The operating system 116 is booted into the memory 104 of the computer 100 for execution when the computer 100 is powered-on or reset. In turn, the operating system 116 then controls the execution of one or more computer programs by the computer 100. The present invention is generally implemented in these computer programs, which execute under the control of the operating system 116 and cause the computer 100 to perform the desired functions as described herein. Alternatively, the present invention may be implemented in the operating system 116 itself. In particular, the present invention is typically implemented with computer programs including database management system (DBMS) software 116. The DBMS software 116 invokes the pragma facility 118 to enable users to specify execution options that override default execution options.

The DBMS software 116 receives commands from users for performing various search and retrieval functions, termed queries, against one or more databases stored in the data storage devices 112a, 112b, 112c. The DBMS software 116 includes an optimizer for optimizing the execution of queries and a plan generator for generating a plan for execution of the query. The optimizer or the plan generator of the DBMS software 116 invoke the pragma facility 118.

The operating system 116 and computer programs are comprised of instructions which, when read and executed by the computer 100, causes the computer 100 to perform the steps necessary to implement and/or use the present invention. Generally, the operating system 116 and/or computer programs are tangibly embodied in and/or readable from a device, carrier, or media, such as memory 104, data storage devices 112a, 112b, 112c, and/or data communications devices 108. Under control of the operating system 116, the computer programs 118 may be loaded from the memory 104, data storage devices 106, and/or data communications devices 108 into the memory 104 of the computer 100 for use during actual operations.

Thus, the present invention may be implemented as a method, apparatus, or article of manufacture using standard programming and/or engineering techniques to produce software, firmware, hardware, or any combination thereof The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Overview

The pragma facility 118 enables a user to provide hints to an optimizer that uses the hints to optimize a query. The pragma facility 118 works in an environment that provides a parallelism strategy that uses parallel infrastructure, various computer platforms (such as the DBC/1012), and multimedia database systems. The pragma facility 118 is directed to user-defined function (UDF) exegesis concerning parallel execution and tuning of UDFs preferably within a massively parallel, shared-nothing system (i.e., a "MPP" system). The pragma facility 118 complements the UDF analysis, which involves parallel execution flow.

The pragma facility 118 works with a multimedia object-relational database system, which is described further in F. Cariño, W. Sterling, and I. T. Ieong, *Teradata-MM— A Complete Multimedia Database Solution,* ACM Multimedia Workshop on Multimedia Databases, San Francisco, Calif., Oct. 21, 1994, which is incorporated by reference herein. Additionally, multimedia object-relational databases are discussed in M. Loomis, *Moving Objects into Relational Systems,* Proceedings of the Database World and Client/Server World, Volume 1, Jun. 14, 1993, which is incorporated by reference herein, and these were developed for emerging multimedia applications. The multimedia object-relational database system defines a framework to integrate multimedia islands of information and related technologies. An example implementation will be described that employs an extensible federated relational database coordinator that non-intrusively adds selected SQL3, which is described in J. Melton and A. R. Simon, *Understanding the new SQL: A complete Guide,* Morgan Kaufmann, San Francisco, Calif., 1995, and which is incorporated by reference herein, and multimedia capabilities to existing relational database management systems, which are described in E. Codd, *A Relational Model for Large Shared Data Banks,* Communications ACM, Vol. 13, No. 6, June 1970, pp. 377–387; F. Cariño and P. Kostamaa, *Exegesis of DBC/1012 and P-90,* Proceedings of the 4th International Parallel Architectures and Languages Europe (PARLE '92), Springer-Verlag, pp. 877–892 [hereinafter "Exegesis reference"]; A. Witkowski, F. Cariño, and P. Kostamaa, *NCR 3700— The Next-Generation Industrial Database Computer,* Proceedings of the 19th International Conference on Very Large Databases (VLDB '93), pp. 230–243 [hereinafter "NCR 3700 reference"]; each of which is incorporated by reference herein.

SQL3 is an emerging, and still evolving, standard allowing users to define Abstract Data Types (ADTs) and User-Defined Functions (UDFs) that operate on the ADTs, thereby extending the types known to the underlying, relational database system. Multimedia-SQL will be used to refer to the SQL3 subset that supports ADTs and UDFs. SQL3 is a nickname for a series of evolving standards, composed of Framework, Foundation, Call Level interface (CLI), Persistent Storage Model, Transactions, and Temporal. The term "object-relational" was coined for adding object support into the relational model. SQL3 is the leading standard object-relational effort.

The present invention uses a parallel multimedia object server to store, manipulate and analyze multimedia objects based on their content. One multimedia object server is described in W. O'Connell, I. T. Ieong, D. Schrader, and et al., *Prospector: A Content-Based Multimedia Object Server for Massively Parallel Architectures,* Proceedings of ACM SIGMOD, Montreal, Canada, June 1996; W. O'Connell, D. Schrader, and H. Chen, *The Teradata SQL Multimedia Database Server,* Technology For Multimedia, IEEE Press, December 1996, Editor Bing Shen, each of which is incorporated by reference herein. A component, called a federated coordinator, generates parallel execution plans for three logical "database" components: a relational database, a multimedia object server, and other special object servers (e.g., video servers).

Database support for multimedia required the integration and development of new concepts to define and manage: (1) multiple networks, (2) data security, (3) system administration, (4) user-interfaces, (5) information workflow, (6) retrieval and updating of multimedia tuples, (7) multimedia object feature extraction and indexing for content-based retrieval, (8) query optimization and (9) performance enhancement. Additionally, each of these topics is addressed for scaleable, very large parallel systems. An overview of the massively parallel architecture, infrastructure, hardware and software strategies used by the multimedia database system will provide a foundation to understand the rationale behind the architecture.

Data warehousing is a business concept for storing and manipulating data. Multimedia information, especially continuous ADTS, like video, requires an evolution of the well-known alphanumeric based data warehouse concept.

Multimedia objects introduce new concepts and technical solutions into the traditional alphanumeric database paradigm. Multimedia objects will be deployed in three waves. A Multimedia Data Warehouse will be described to illustrate how the emerging "multimedia-object relational" paradigm requires changes to databases, networking and applications. A five-year National Institute of Standards and Technology (NIST) medical knowledge bank program will be described that uses the framework, concepts and multimedia object relational database system (MORDBS). The multimedia object relational database systems may handle large amounts of data (e.g., a petabyte ($10^{15}$ bytes)) based on hardware platform capabilities.

Multimedia Data Warehouse

A data warehouse is a business concept to convert raw enterprise-wide and company-wide data into strategic and timely information available to the entire enterprise. W. H. Inmon, *Building the Data Warehouse,* QED Technical Publishing Group, Wellesley, Mass., 1992; W. H. Inmon, and R. D. Hackathom, *Using the Data Warehouse,* Wiley-QED Publication, New York, 1994, each of which is hereby incorporated by reference.

Figure 2:
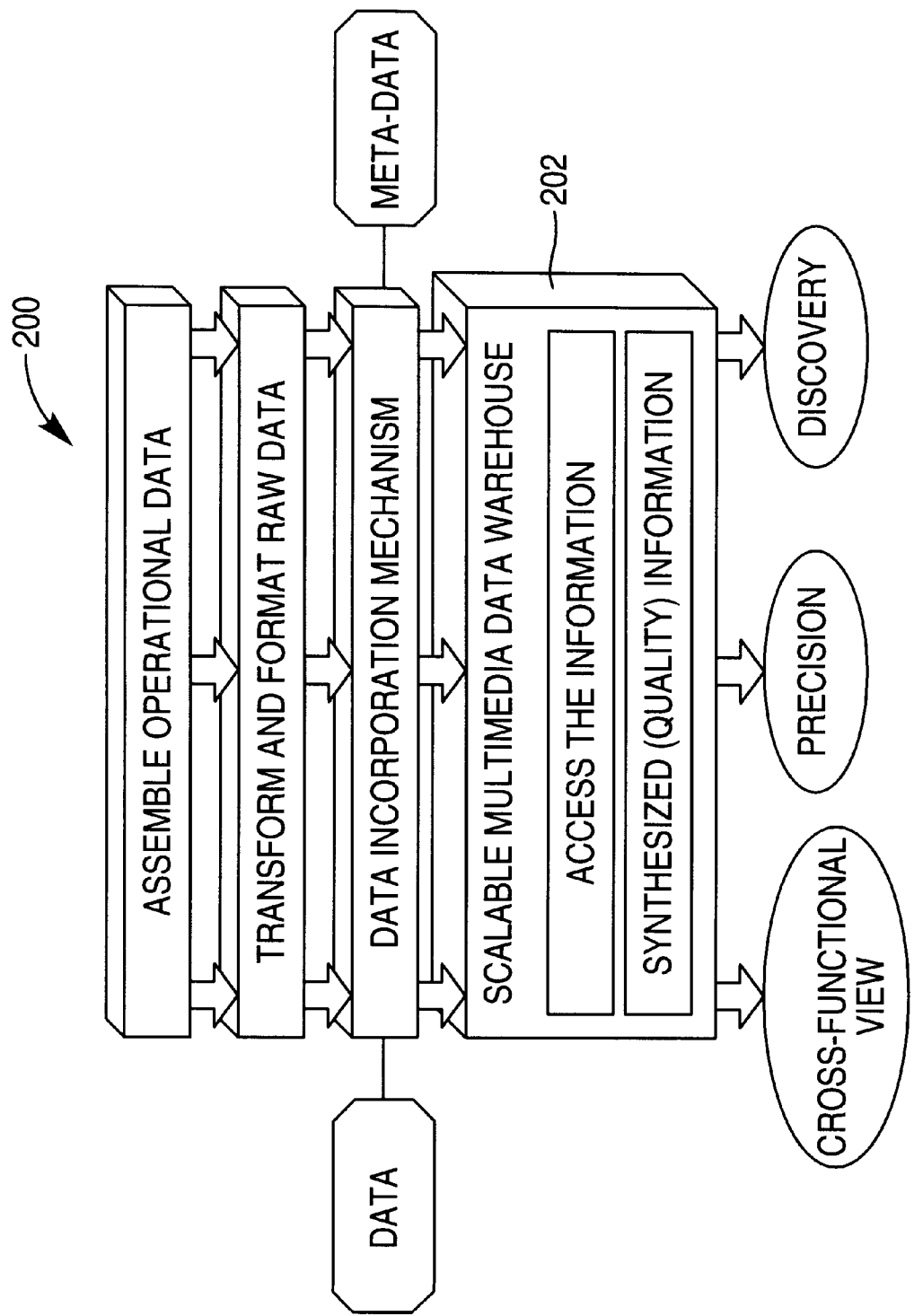
FIG. 2 illustrates a multimedia data warehouse and the information flow through the data warehouse.

FIG. 2 illustrates a multimedia data warehouse 202 and the information flow through the data warehouse 200. Operational data is assembled, raw data is transformed and formatted, and then a data incorporation mechanism incorporates data and meta-data into the scaleable multimedia data warehouse 202. The multimedia data warehouse 202 enables access of information and synthesized information.

Data warehousing applications use tools to collect information and store them in relational databases. The database system query facility is then used to convert the raw data into information. Data warehousing uses include: (1) cross-functional views of data across on an enterprise; (2) data precision to identify specific information; and (3) discovery of trends or information that challenges conventional enterprise assumptions, which are discussed further in M. Bell, *The Montage Extensible Datablade Architecture,* Proceedings of Association for Computing Machinery Special Interest Group on Management of Data, Vol. 23 No. 2, June 1994, which is incorporated by reference herein, [hereinafter "Montage reference"].

As shown in FIG. 2, the data warehouse information concept is defined as: (1) assemble operational data; (2) transform raw data in warehouse form; (3) distribute the information into the warehouse; and (4) access the data or mine for information from the warehouse. S. Atre and P. Storer, *Data Distribution and Warehousing,* DBMS, October 1995, pp. 54–62, which is incorporated by reference herein.

R. Hackathom in *Data Warehousing Energizes Your Enterprise,* Datamation, February 1995, pp. 3845, which is incorporated by reference herein, emphasizes the dynamics of data and meta-data flow. Multimedia objects provide richer and more visual raw data for information repositories, object data mining for information, and information workflow.

Multimedia Database Development

Multimedia technology and multimedia database systems, which are described in A. Ghafoor, Editor, *Special Issue on Multimedia Database Systems,* ACM Multimedia Systems, Volume 3, Number 516, 1995, which is incorporated by reference herein, and applications can be categorized into three waves: (1) multimedia communications; (2) content storage and retrieval; and (3) content-based analysis.

In the first wave, multimedia was used as a communication mechanism. Video conferencing, say for tele-medicine, is an example of multimedia communications. However, once a multimedia communication occurred, its content is lost (i.e. lacks multimedia data persistence).

In the second wave, persistence is added to the multimedia communication (e.g., digitally storing a tele-medicine video conference). Wave (2) multimedia information, like video, requires a technology, infrastructure and use that is expected to result in a database paradigm shift. Multimedia data, such as a video of a surgery, is stored so that it can be retrieved or broadcast at another time. In the example below, a query retrieves an object based on an alphanumeric coded data predicate.

SELECT name, age, MRI FROM PatientTable WHERE name='Elisa Doe';

In the example below, a query retrieves information based on an alphanumeric coded data predicate, and a "projection" or "transformation" UDF ZoomIn() is applied to the retrieved magnetic resonance imaging ("MRI") columns containing MRI scan sets (multiple MRI images). MRI is a technique for creating images of cross-sections, or "slices", of parts of the body, such as the brain.

SELECT name, age, ZoomIn (MRI) FROM PatientTable WHERE name='Gaby Doe';

In the third wave, a facility to locate, retrieve and analyze data based on (multimedia) object content is provided. The example queries discussed with regard to the second wave above were based on traditional SQL2 predicates (e.g. name="Elisa Doe"). On the other hand, a multimedia-object content-based query is one that includes functions in the predicate. These functions analyze the content of an object, such as finding a face in a video or analyzing a digitized MRI scan set to determine if a tumor is detected within a certain confidence level.

The following sample query includes a UDF that analyzes an ADT:

SELECT name, age, LateralView(MRI) FROM Patient WHERE
    FindTumor(MRI)>0.8;

In the above query, "FindTumor" is a predicate UDF which analyzes an MRI scan set and returns a confidence level for the presence of a tumor. "LateralView" is a projection UDF which returns a lateral view projection extracted from the multiple MRI images in the MRI scan set.

National Medical Practice Knowledge Bank

Figure 3:
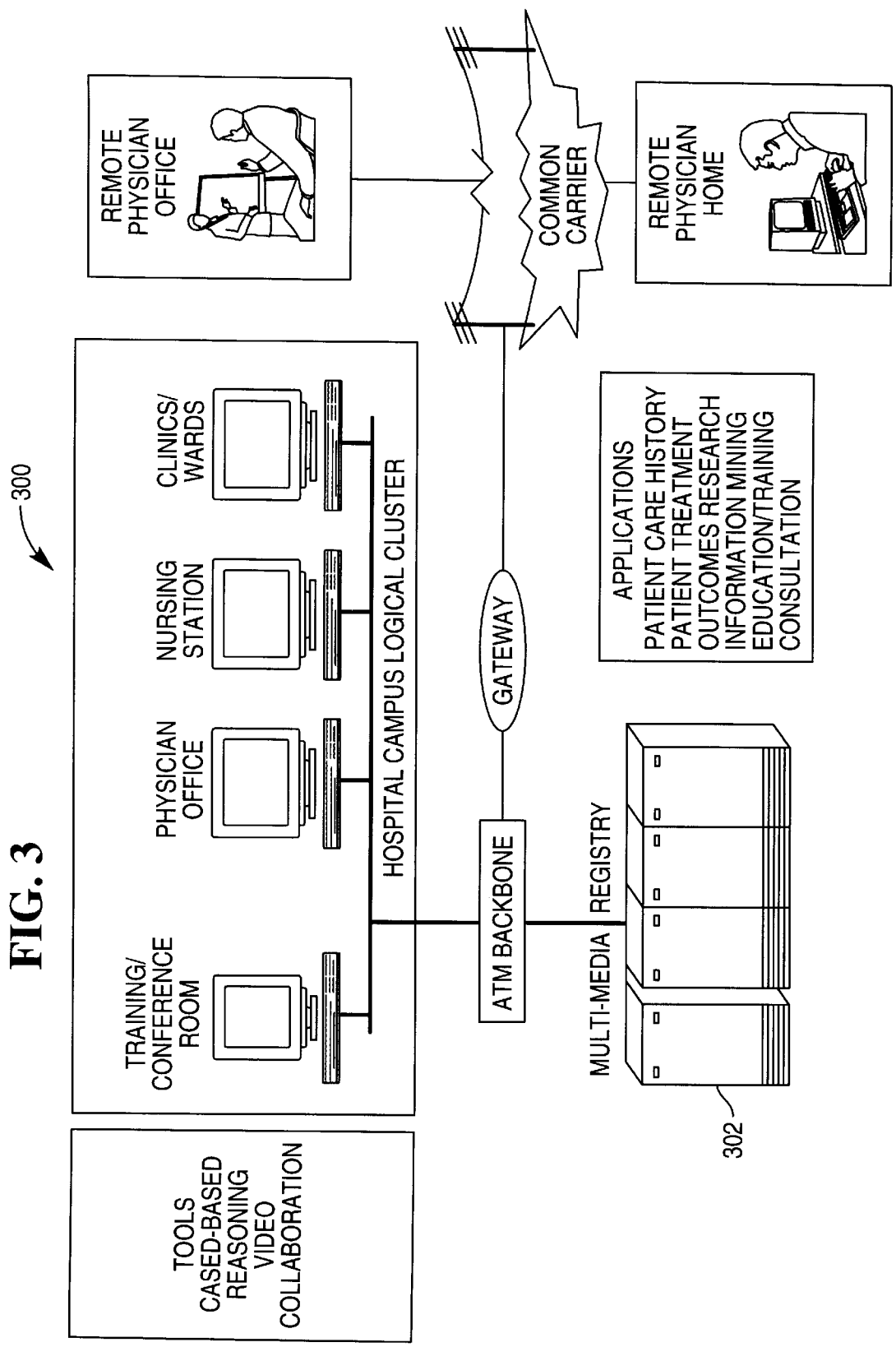
FIG. 3 illustrates a high-level architecture, system view, and information flow for a National Medical Practice Knowledge Bank.

A multimedia database is useful in many fields of practice, including healthcare. FIG. 3 illustrates a high-level architecture, system view, and information flow for a National Medical Practice Knowledge Bank ("Knowledge Bank"). The Knowledge Bank is a leading-edge program funded by the National Institute of Standards and Technology Advanced Technology Program ("NIST-APP") that uses a multimedia database. The Knowledge Bank 300 requires that multimedia data warehouse tools and special programs be developed to import and format hospital legacy and equipment data so that it can be stored in a multimedia database, called the Multimedia Registry 302.

The Knowledge Bank 300 includes data from the medical domain of neurosurgery, cardiology, and oncology. The Multimedia Registry 302 is a multimedia database which is the main repository of medical data for the Knowledge Bank 300. The Multimedia Registry 302 will hold the following types of data: (1) patient records, including digitized medical imagery and other complex objects representing medical data; (2) videos of surgical techniques; (3) video interviews with specialists covering diagnosis, treatment, surgical technique, and other medical subjects; and (4) critical pathways for patient treatment and recovery (decision trees for patient care based on patient observations, accepted treatments and expected outcomes).

The Knowledge Bank 300 works in an environment with a massively parallel object-relational database system with large (e.g., petabyte) storage capability. The Knowledge Bank 300 requires the ability to manipulate and analyze objects within the context of a database query and to perform voice-to-text translations. The Knowledge Bank 300 also requires automated video indexing and segmentation, Case Based Reasoning (CBR) tools for computer assisted patient diagnosis, and user interfaces which require minimal physician training.

There are two primary modes of access to the Multimedia Registry 302. In the first, users located at interactive endpoints can perform updates and queries against the Multimedia Registry 302. These endpoints are clients in a client/server environment. In the second, two or more video endpoints can participate in a video collaboration session. All participating endpoints can simultaneously access and view data from the Multimedia Registry 302.

The training and interview videos are stored as video objects in the database. Likewise, medical imagery included as part of patient records will be stored as objects. Software for performing voice-to-text conversion, video indexing, and image analysis for case based reasoning are stored as User Defined Functions (UDFs) in the database, and operate directly on the stored objects when invoked by an SQL query.

Patient data can be extracted from hospital legacy systems and formatted for the Multimedia Registry 302. Data will be extracted from a multi-campus hospital network and accessed by healthcare professionals on all campuses, utilizing a high bandwidth Asynchronous Transfer Mode ("ATM") network. The Knowledge Bank 300 can be accessed off campus via modem or Integrated Services Digital Network ("ISDN") connection. The Knowledge Bank 300 can be used for data mining operations on consolidated patient records. For example, outcomes research can be performed against patient records to evaluate the critical pathways. Finally, the Knowledge Bank 300 is accessible by the video collaboration system installed throughout campuses to allow video-conference participants to simultaneously view data, including multimedia objects, from the Multimedia Registry 302.

Massively Parallel Architecture. Infrastructure, and Technology

The present invention is implemented on a DBC/1012 parallel computer hardware, described further in the Exegesis reference, and a relational database management system based on a loosely-coupled shared-nothing architecture, described further in M. Stonebraker, *The Case for Shared-Nothing*, IEEE Data Engineering Bulletin, Volume 9, Number 2, 1986, pp. 4–9, which is incorporated by reference herein. The DBC/1012 and relational database system scale to the terabyte level by employing a parallel infrastructure consisting of (1) a Ynet interconnection network (an active synchronous interconnection bus) used to communicate and share data between the processors, (2) a proprietary operating system designed for parallelism, and (3) a system partitioning for fault-tolerance.

The relational database on the DBC/1012 generates query plans, which are described further in the NCR 3700 reference, to exploit the massively parallel architecture. On the DBC/1012, Interface Processors (IFPS) handle mainframe connections and Communication Processors (COPS) handle workstation and PC connections. The Access Module Processors (AMPS) have disks for storing the actual. The key to exploiting parallelism is to generate a parallel query plan. On the DBC/1012, the relational database query plan module generates Steps that are broadcast to the AMPs via the Ynet interconnection network. Steps are parallel pseudo-database operations used to exploit shared-nothing parallel processing with support from the interconnection network.

A next-generation computer platform for a symmetric multi-processor (SMP) architecture, is further described in F. Cariño, W. Sterling, and P. Kostamaa, P., *Industrial Database Supercomputer Exegesis—Me DBC/*1012. *The NCR* 3700. *The Ynet and The BYNET,* Emerging Trends in Knowledge and Database Systems, IEEE Computer Society Press, Los Alamitos, Calif., pp. 139–157, [hereinafter "Industrial reference"] which is incorporated by reference herein. The SMP nodes are called Processor Module Assemblies (PMAs). Each PMA manages a disk array. A theoretical configuration consists of 4096 PMAs, and, based on the size of the disk array, the computer 400 can support large (e.g., petabyte) size database applications. The next generation computer platform also has a parallel infrastructure that uses a next-generation interconnection network, the BYNET. A comprehensive exegesis of a relational database, the Ynet, and the BYNET interconnection networks can be found in the Industrial reference and the NCR 3700 reference.

Parallelism

Figure 4:
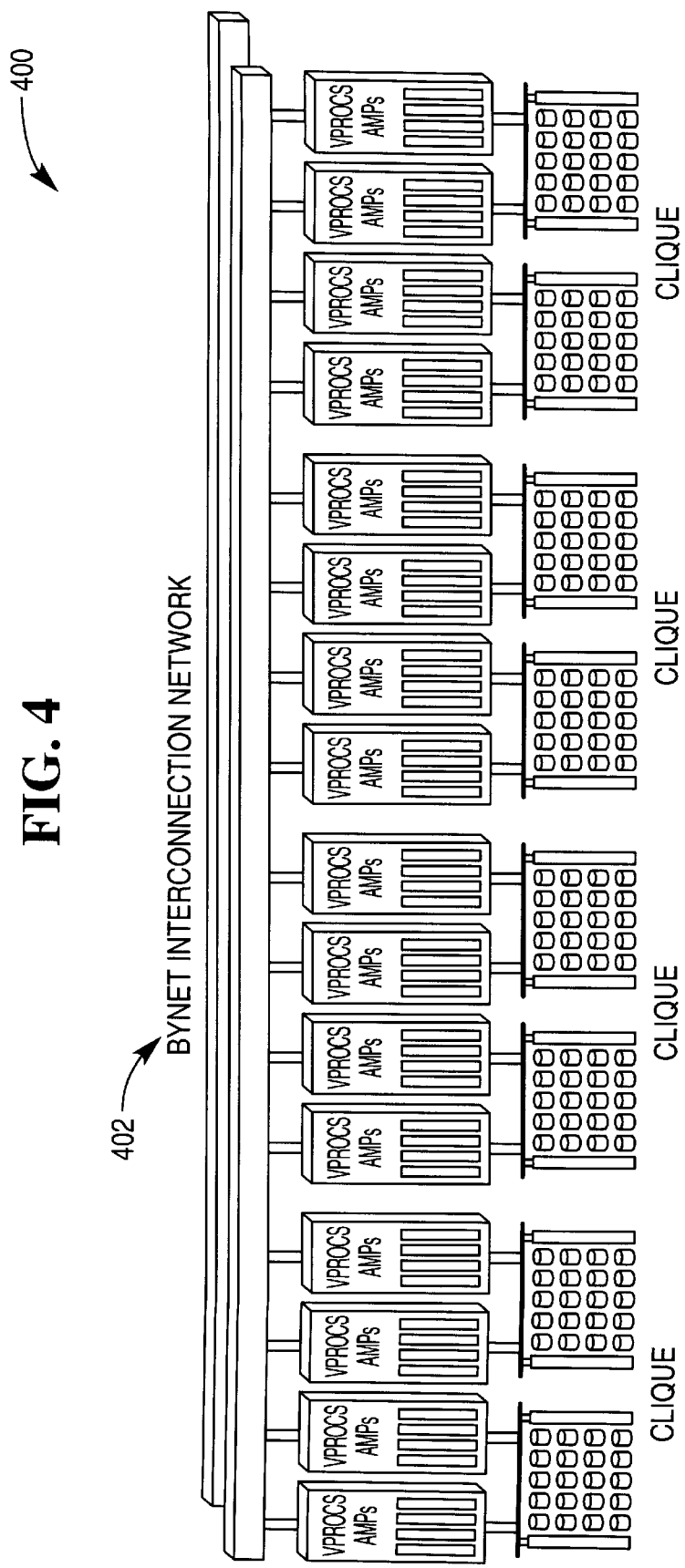
FIG. 4 illustrates a massively parallel, shared-nothing (MPP) architecture.

FIG. 4 illustrates a massively parallel, shared-nothing (MPP) architecture 400. The MPP architecture 400 includes a BYNET interconnection network 402 for connecting nodes. There are a number of components comprising a parallel architecture, including multiple processors, an interconnection network 402, an operating system that supports parallelism, and a database system that supports parallelism. The multimedia database works with the next generation computer with the following:

UNIX/Parallel Database Extensions (UNIX/PDE) operating system—which provides virtual processor (Vproc) and globally distributed object (GDO) facilities. Vprocs are a way of encapsulating the database functionality in an SMP environment. This encapsulation is done to provide availability and independence of the physical computer where the Vproc runs. The PDE facilities automatically restart all Vprocs from a failing computer on other computers that share the I/O connectivity.

BYNET interconnection network 402—provides the necessary bandwidth to distribute/redistribute the data and synchronize the parallel processes.

STEP instruction set—provides a parallel pseudo-database intermediate language. The query plan generator and optimizer can generate STEPs that utilize the Vproc facility and interconnection network services to exploit system parallelism.

The multimedia database uses the existing and developed new parallel infrastructure for large multimedia objects. The Vproc facility is reused, since it is scaleable and has been proven reliable in very large applications. The following is newly developed parallel infrastructure:

Multimedia Infrastructure (MI)—provides a scaleable infrastructure to get, put, send or receive data or messages. MI provides a mechanism to execute functions on Vprocs where worker processes work on their share of the data MI provides transparent execute migration to other Vprocs and hides the details of the underlying operating system from the developers and system code.

Agent/Event—an internal communication system to send and receive data It is designed based on the software agent paradigm, which is described further in M. Geneserethm and K. Ketchpel, *Software Agents*, Communications of ACM, Special Issue on Intelligent Agents, Vol. 37, No 7, July 1994, pp. 48–53, incorporated by reference herein.

M-Step (Multimedia Steps)—pseudo-database machine steps designed for a object-oriented and federated architecture.

Object Server Connectivity—high speed secondary network manager.

Multimedia Database Architecture and Framework

The SQL3 multimedia object-relational database works with a federated coordinator that non-intrusively adds ADT objects and UDF capabilities to one or more heterogeneous relational databases. Multiple heterogeneous database issues and solutions are described in F. Cariño, *HETERO—Heterogeneous DBMS Frontend*, Proceedings of the International of the International Federation Information Processing Technical Committee (IFIP TC) 8/WG 8.4 Working Conference on Methods and Tools for Office Systems, October 1986, pp. 159–172, which is incorporated by reference herein.

FIG. 5 illustrates the multimedia database architecture 500 in which the pragma facility 118 works. The multimedia database architecture 500 logically integrates: (1) the multimedia database system 502, (2) the multimedia object server 504, and (3) other object servers 506 via a special application interface.

Multimedia and object data require new functionality and concepts, as further described in W. Sterling and F. Cariño, *Multimedia Databases and Servers*, AT&T Technical Journal, Volume 74, Number 5, September/October 1995, pp. 54–67, which is incorporated by reference herein. The key new concepts not found on or traditionally part of object or relational database systems include:

Two-Pass Paradigm for multimedia object retrieval.
Object Server Connectivity (OSC) network management.
Multimedia Object Locators (MOLs).
Multiple Data Receivers for information workflow.
Kerberos security tickets used with MOLS.
Object extensions to the Call Level Interface.
New optimizer strategies.

A Two-Pass Paradigm retrieves multimedia objects in two passes. That is, it retrieves tuples that have multimedia objects as columns. For alphanumeric SQL2 tuples (i.e. not ADT objects), the values are returned to an application or user-interface. It is not practical to return an answer set to a user with columns composed of 2 GB objects. In the first pass, an SQL SELECT query with multimedia objects returns a special identifier in the tuple. In the second pass, the values of the objects represented by those special identifiers are moved from the server to the client. This can be done via another high-bandwidth network.

Object Server Connectivity (OSC) provides multiple network access to the object data stored on servers. For example, a multimedia-SQL SELECT query with large video columns could be submitted via a 10 megabits per second LAN to the multimedia database coordinator. In the second pass, another higher bandwidth network with guaranteed Quality of Service (QoS) could be used to deliver selected video column values to a client. OSC manages the multiple networks, client-server connections and QoS issues.

Multimedia Object Locators (MOLS) are internal special identifiers generated to point to a multimedia object location. A MOL is like an Internet Universal Resource Locator (URL). MOLs provide a mechanism to create a specific link to an internal database file where the object is stored. This is important in shared-nothing, multi-computer and/or distributed systems to minimize message and data being routed to client(s).

A MOL is created by a transform operation that logically concatenates a Multimedia Object Identifier (MOID), a network address, and Kerberos ticket into a unique locator. The MOID contains the directory and file information needed to locate an object. The network address is the address of the computer where the object is stored. The optional Kerberos security ticket is used for user identification. Kerberos is part of Distributed Computing Environment (DCE) and provides a secure mechanism to authenticate users who want to retrieve ADT objects. Kerberos is further described in J. Shirley, W. Hu, and D. Magid, *Guide to Writing DCE Applications*, O'Reilly and Associates, Sebastool, Calif., May 1994, which is incorporated by reference herein The user interface (UI) has been modified to incorporate a Two-Pass Paradigm and MOL data retrieval process for ADT objects. The following example illustrates the new user interface concepts. The interactive user interface lets the user specify a query such as the following:

> SELECT name, age, ShowTumor (MRI) FROM patient WHERE age>40 AND FindTumor (MRI)>0. I ORDER BY age;

The above query shows the ADT and UDF capabilities of multimedia-SQL. In this example, the user defined an MRI ADT and used it as a column of a table. The multimedia Answer Set Manager returns <name, age, MRI.MOL> and the user interface displays an ICON or ADT object thumbnail. FIG. 6 illustrates a user interface 600 that includes an icon 602 that represents an ADT object.

Figure 7:
FIG. 7 illustrates an image that results from selection of an icon or thumbnail representing an ADT object.

When a user selects a specific MRI by clicking on an icon or thumbnail, the MOL is used to create a connection to the computer at which the data object is stored. In this case, a ShowTumor() UDF is executed only on the selected MRI object and displayed in the second pass. FIG. 7 illustrates an image 700 that results from selection of an icon or thumbnail 602 representing an ADT object. A user can choose to retrieve all the objects in the first pass, but this is not always practical.

Figure 8:
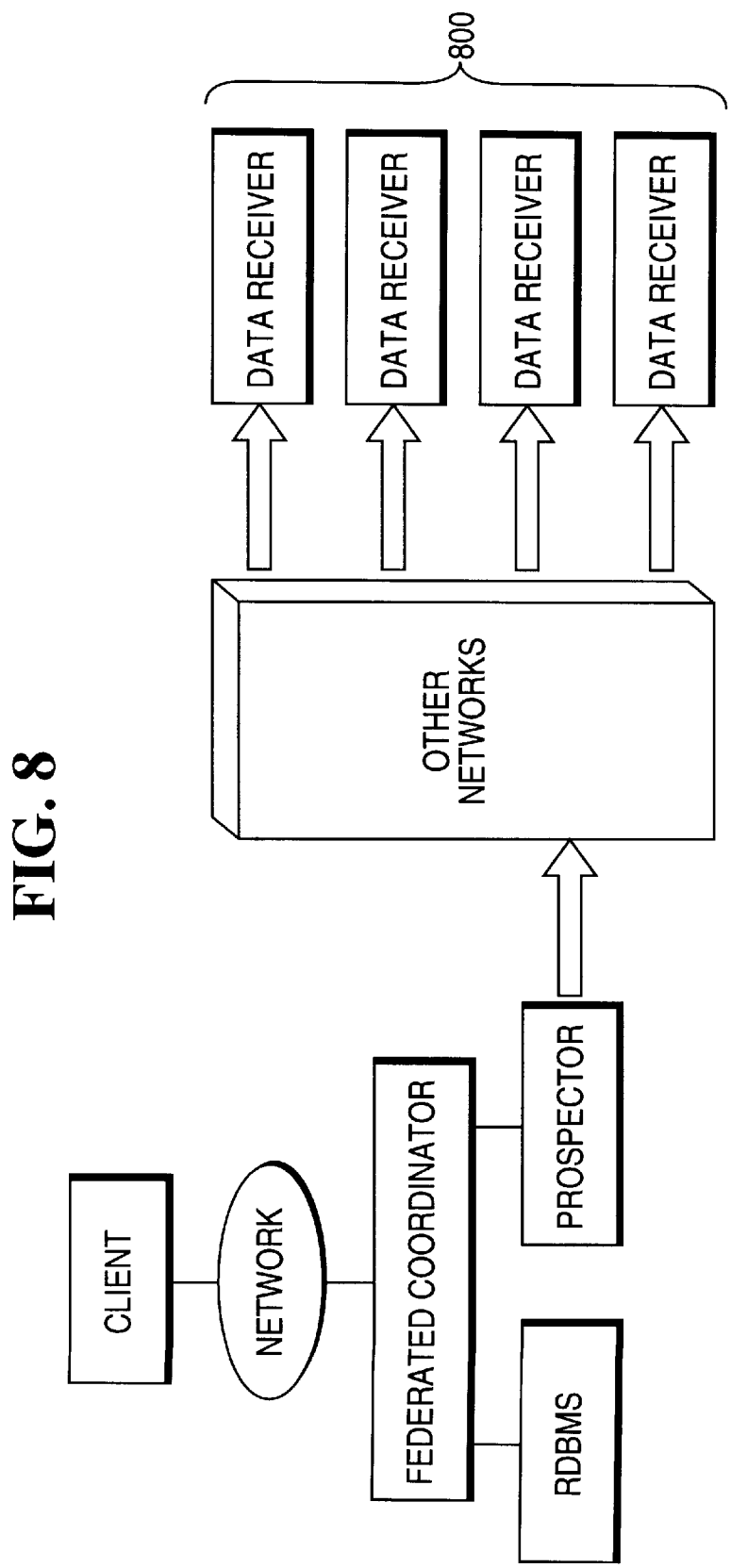
FIG. 8 illustrates multiple data workflow receivers where the results of an multimedia-SQL query are sent/broadcast to multiple receiving clients.

FIG. 8 illustrates multiple data work flow receivers 800 where the results of an multimedia-SQL query are sent/broadcast to multiple receiving clients. Similar to an electronic-mail system, the receivers 800 notify users that they have a message, and the message is retrieved and displayed when selected by a user. The multimedia Answer Set Manager (ASM) transforms each MOID into a MOL. When the multiple receiver option is used, a message is sent to the receivers 800. A receiver 800 can retrieve the answer set, and then retrieve specific ADT objects contained within the tuples.

Keeping answer sets for long periods can require large amounts of disk space. A system option determines how long to keep an answer set. The multimedia database releases locks on objects at the end of a transaction, and, therefore, the action objects could change before a receiver fetches the object. In this case, the user is informed of the change. The user can then issue a query to retrieve the "new" modified object values.

Database Security is handled via SQL GRANT/REVOKE for security. Kerberos Security Tickets are an optional part of an MOL sent back to clients or receivers in the first pass. Kerberos tickets provide a user identification mechanism. The client/user interface presents the MOL, and the multimedia database coordinator validates user identification and access rights to the object. If both are valid, then object retrieval can proceed.

UDFs can be implemented in a programming language, such as C or C++. UDFs may read or write data. Also, a 'thin fire wall layer' prevents UDFs from using I/O to read/write objects. UDFs operate on one tuple at a time and only this data is accessible to the UDF.

System Administration includes initial loading of multimedia objects into the system, backup utilities, and restore utilities. For example, the bulk load utility loads videos into the multimedia object server. It may not be feasible to back up a very large (e.g. petabyte) multimedia database. In certain cases, it may be practical to only back up the relational data and have a disaster recovery system that loads the multimedia data and perhaps executes transforming UDFs to recover a database or database subset. A Check Table utility navigates the tables to verify the integrity of MOID references in a database.

For UDFs, a query optimizer that supports UDFs, networking, remote object access, and temporary value storage, the optimizer uses costs and rules to generate an optimal query plan. This is especially true of massively parallel, shared-nothing (MPP) systems. Also, the pragma facility 118 lets a user provide information to the query plan generator on other strategies for plan generation. Multimedia-SQL has been extended to provide a mechanism whereby a UDF is executed only when a value is inserted, updated and or modified. UDF invocations can be expensive in terms of time, data movement and internal resource consumption. Computing the UDF values and storing these internally lets the optimizer convert potentially expensive UDF invocations to hidden column references. Moreover, an Object Feature Extraction and Indexing enables content-based queries to retrieve tuples based on object features. The pattern matching is done in feature space (features extracted from the object). Hence applying a potentially expensive UDF to every native ADT object is avoided.

Federated Coordinator

Figure 9:
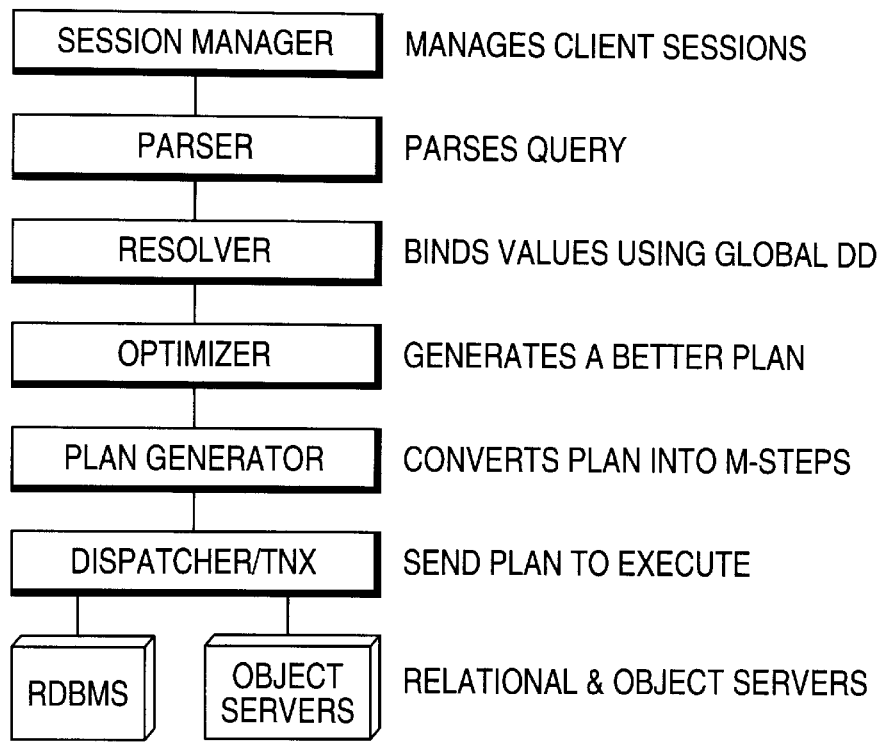
FIG. 9 illustrates a federated coordinator that facilitates vertical table partitioning among three logical components.
Figure 11:
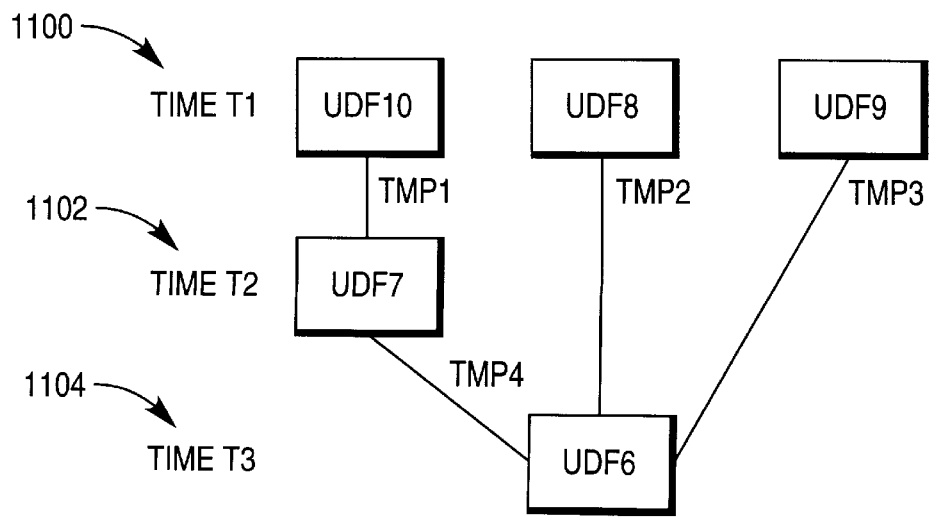
FIG. 11 illustrates the logical execution flow for a nested UDF.

A multimedia table is fragmented both horizontally and vertically. FIG. 9 illustrates a federated coordinator 900 that facilitates vertical table partitioning among three logical components. The three logical components are: (1) the multimedia relational database where alphanumeric data is stored, (2) the multimedia object server, and (3) third party object servers. The vertical fragmentation is done on the basis of column data type. The multimedia databases distribute rows based on a hashing function, but the multimedia object server supports multiple object distribution strategies, i.e. hashing, range, round robin, etc.

As discussed above with reference to the user interface and two-pass paradigm concept analysis, UDFs are executed and answer sets sent back to clients or receivers. The predicate (e.g., the WHERE-clause) is evaluated and multimedia database returns the MOL values for ADT columns. The UDFs that appear in the predicate are evaluated in the first pass. The user can select one or more columns to view. In this case, a projection transforming UDF is applied to a MRI column before sending the MRI to the client for viewing. For continuous data, such as audio or video, displaying or playing more than one ADT at a time is not feasible.

The following is a sample query referencing ADT columns:

> SELECT name, age, ShowTumor(MRI) FROM patient WHERE age>40 AND FindTumor (MRI)>0.1;

The UDFs may be written in C++, and a UDF install utility validates data types, compiles and installs a UDF on the object server. Also, a library of pre-defined ADTs and UDFs is available, as described further in the Montage reference.

The federated coordinator 900 receives user queries and generates a query plan composed of parallel steps, called M-STEPS, that execute on both the multimedia relational database and the parallel multimedia object server.

These components are:

Session Manager—manages sessions and interfacing with clients.

Parser—converts SQL query into a parse tree.

GDD Manager—maintains a GDD cache.

Security—enforces security based on GRANT/REVOKE privileges stored in GDD security table.

Optimizer—optimizes for parallelism (see Section 5.1).

Plan Generator—converts the query plan into M-Steps.

Dispatcher—coordinates and sends the M-Step execution plan to the relational database, multimedia object server, and other special servers.

Answer Set Manager (ASM)—collects the intermediate results stored in temporary files. The ASM is responsible for merging the spool files from the relational database and object server(s).

Transaction (TNX) Manager—determines whether to commit or rollback transactions.

Multimedia Object Server

The multimedia database uses the multimedia object server to store ADT objects and execute UDFs that perform content-analysis (in predicates) and content-transformations (in projection list) in parallel. It is a general-purpose content analysis server designed for symmetric multi-processor and massively parallel processor environments. It provides the ability to define and manipulate UDFs which are invoked in parallel to analyze and manipulate the contents of objects.

The multimedia object server incorporates:

A generic platform that is application independent and extensible.

Programmable agents.

Content-based object analysis capabilities through UDFs.

Extensive support for large object data placement.

A UNIX-like file system API for accessing large objects.

Figure 10:
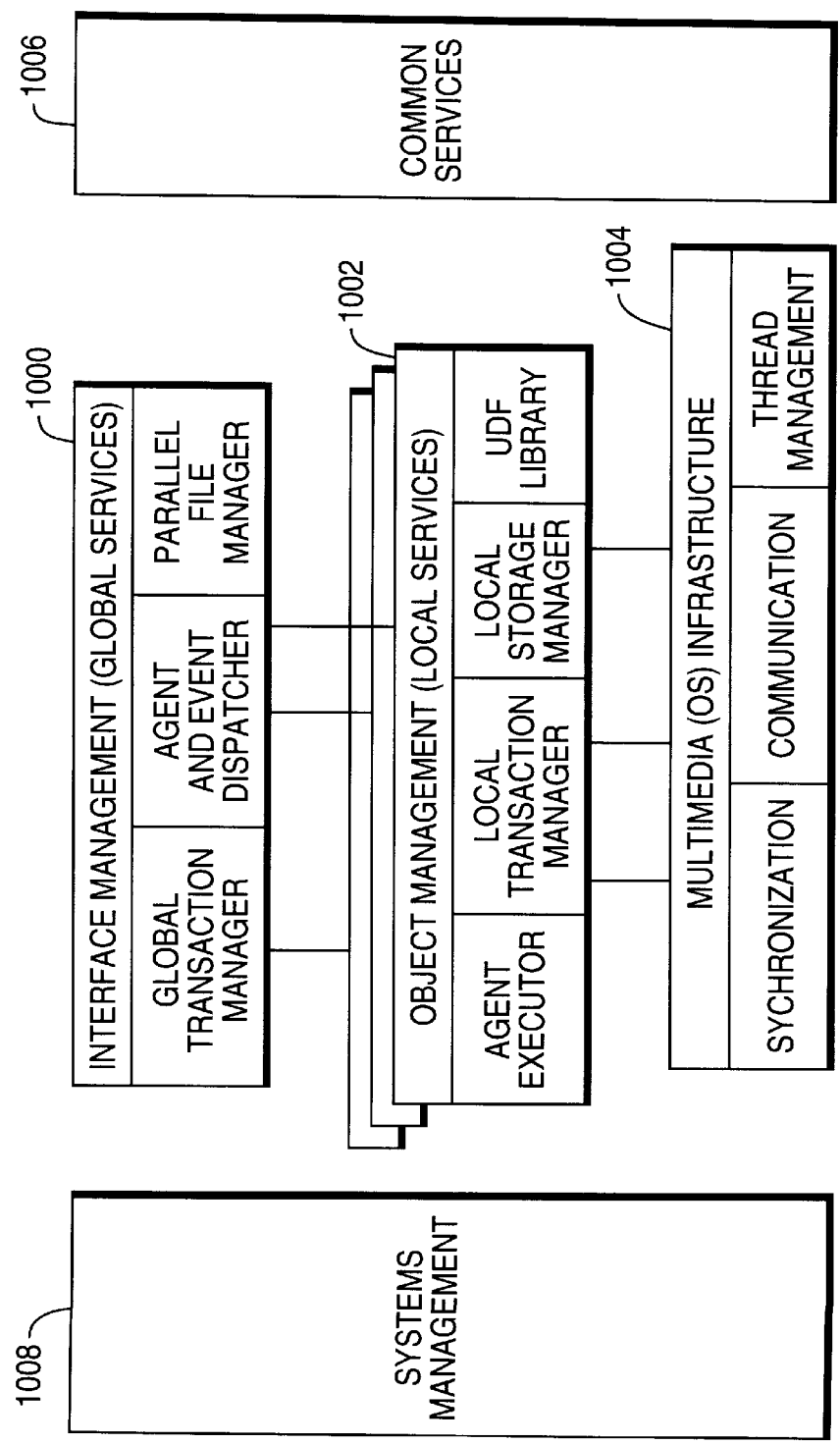
FIG. 10 illustrates the multimedia object server and its components.

FIG. 10 illustrates the multimedia object server and its components. As shown in FIG. 10, the software architecture consists of five major components:

An interface management component 1000 for global services.

Object management component 1002 for local services.

Multimedia (operating system) infrastructure 1004.

Common services component 1006.

Systems management component 1008.

The Interface Management component 1000 consists of the global transaction manager, agent and event dispatcher and the Parallel File Manager. The Global Transaction Manager provides interfaces to begin, prepare, commit and abort transactions that conform to the XA standards. The Agent and Event Dispatcher parallelizes a user request using agents and events over the appropriate Vprocs for processing and transforms the user request into one or more agents. Prior to dispatching, the Agent and Event Dispatcher programs the agents with the sequence of the Vprocs to be visited and the operations (for example, a UDF) to be performed at the various Vprocs. Computation in the system is based on the execution of work by agents which is triggered by the receipt of events (messages). The Parallel File Manager provides storage/retrieval capabilities with transactional semantics on all Vprocs. Objects are maintained in a parallel persistent storage system. The location of objects are hidden from the external user. As the system is reconfigured, the objects are transferred from one Vproc to another in a transparent fashion and the same OID can be used to reference the object. The parallel File Manager provides the capability to organize and group objects into directories. Each directory is defined with one of numerous distribution strategies over the Vprocs.

The Object Management component 1002 provides services that are local to Vprocs and provide access to persistent storage and the UDF library. The Local Transaction Manager provides the traditional ACID (Atomicity, Concurrency, Isolation and Durability) transaction properties. The Agent Executor provides computation capabilities by supporting programmable agents. During an agent's execution, the Agent Executor may trigger other events, create new agents, access the persistent storage, execute UDFs, and migrate to other Vprocs. The Local Storage Manager utilizes a storage manager as the core storage system to provide persistent storage and allocation, concurrency control, and recovery of objects. The storage manager used is a persistent file system that provides Two-Phase Commit transaction and Two-Phase Locking facilities. The Local Storage Manager does not impose any limits on the size of the objects. A single object may span multiple disks on a Vproc. The UDF Library provides an extensible set of abstract data type (ADT) algorithms to do content-based analysis on objects. It provides the ability to load, store and execute application specific UDFs (e.g., extract fingerprint features, compare fingerprint features, etc.).

The Multimedia Infrastructure 1004 provides synchronization, communication and system resource management services across the Vprocs. Synchronization provides services to synchronize among the various object servers and application processes via monitors. Communication provides services to facilitate the communication among and between the various object servers and application processes by transporting messages containing control and data information between the processes. Thread management provides a mechanism for executing and managing, processes in the multimedia object server environment.

The common services component 1006 provides services that are utilized by all other components such as the tracing and the error handling facilities.

The systems management component 1008 provides system start-up, system shutdown, configuration and postmortem analysis services.

The Pragma Facility

To address difficult plan generation and optimization issues a pragma facility 118 was developed. Performance experts and database tuners have developed a portfolio of tricks to help the query plan generator and the optimizer create a specific execution plan. Some optimization requires semantic knowledge of UDF execution, and optimal execution plans may depend on intermediate result set characteristics. Also, there are non-standard queries that deviate from the normal database usage patterns.

The pragma facility 118 lets a user tell the optimizer the user-desired execution. In particular, the pragma facility 118 enables a user can specify particular execution options that override default execution options.

SQL3's new ADT and UDF capabilities create new challenges beyond optimizing SQL2 queries. The parallel query plan generation, optimization, tuning, value caching, and indexing of the present invention is for parallel shared-nothing, MPP architectures.

SQL optimizers use cost estimation and/or rules, tuple statistics, and indexes and/or sampling to optimize queries. Large multimedia databases that use UDFs introduce new complexity to each of the these optimizer tools. Cost estimation of UDFs works when the average execution time has low variance. Consider a UDF that does content analysis of video columns where some videos are a few minutes and some fifteen hours in length.

Sampling implies running a random instance of every UDF in the query and using this information to generate an efficient query plan. Sampling is easy to implement, but assumes that a UDF execution time is uniform across all objects. If sampling is used on a UDF with large execution cost variance, then non-optimal plans may be generated. Of course, if the cost variance varies widely, an efficient plan may not be possible. The optimizer contains formulas evaluating the criteria used by the optimizer. The optimization criteria include: response time, throughput, disk space utilization, and networking costs.

The key UDF optimization issues include:

For nested UDF invocations, determining which ones can be executed in parallel and the mechanism to "pipe" results to the UDFs at the next level of nesting. The tradeoffs are temporary files versus a real "UNIX-like pipe" which has partial result and tuple pairing complexity.

For predicates with multiple UDFs, determining the order of execution and balancing response versus throughput issues.

For a two-pass paradigm, delaying projection UDF execution or object retrieval to pass(2).

For UDFs with multiple ADT parameters, determining which Vproc is to execute the UDF and what strategy is to be used for the other ADT parameters in the UDF. For example, determining whether to move (e.g., copy) the ADT(s) to a particular Vproc or access the ADT(s) via a remote procedure call (RPC).

Determining whether to use an update-in-place UDF, which is a special UDF that can "safely" write over an existing ADT object without creating integrity problems. This avoids making a copy of the ADT object being modified. An example would be a Time-Series UDF that appends stock tick values to the end of a (stock price, time) sequence.

UDF execution or resource usage variance based on ADT object values.

Streaming data to clients, and determining buffering and network usage.

For nested UDF invocations, parallel pipelining process, intermediate result, and asynchronous execution issues arise which require a determination as to when data can be "streamed" to the next nested UDF. Whether data is "streamed" to the next nested UDF by a parallel pipelining process or a temporary file process, ability to migrate a process to the computer where one of the objects is stored is required. The following is a sample query containing nested UDF invocations:

SELECT*FROM PatientTable WHERE UDF6 (UDF7(ADT1, UDF10(ADT2)), UDF8(ADT3), UDF9(ADT1));

FIG. 1 illustrates the logical execution flow for a nested UDF, UDF6 in the above query. At time T1, 1100, UDF10(2) which results in Tmp1, UDF8(ADT3) which results in Tmp2, and UDF9(ADT1) which results in Tmp3 are executed. At time T2 1102, UDF7(ADT1, Tmp1) which results in Tmp4 is executed. At time T3 1104, UDF6(Tmp4, Tmp2, Tmp3) is executed. This execution strategy generates a temporary (spool) file for each nested UDF invocation. With the temporary file approach, it is easy to correctly align parameter values. For example, for UDF6 generating the appropriate parameters is simply done by reading temporary files Tmp4, Tmp2, Tmp3 in sequential order. The pragma facility 118 enables a user to specify when data can be "streamed" to the next nested UDF.

Additionally, nested queries raise the same issues as nested UDFs. Also, an INSERT-SELECT is a special case of nested queries. For an INSERT-SELECT statement, data is selected from a table and then inserted into another table. This raises streaming issues. A user can use the pragma facility 118 to indicate whether to complete the SELECT while writing values to a temporary spool file or pipeline values from the SELECT and INSERT them as they are selected.

For predicates with multiple UDFs, the order in which the UDFs are executed could affect performance. The primary factor in determining UDF execution order is UDF selectivity (i.e., the percentage that reflects whether a row is kept or rejected by the UDF). UDFs with "high" variance for execution time and temporary resources are difficult to optimize since their execution time and resource usage are based on each individual object value. For example, assume that a video analysis UDF execution time and resource usage is based on the length of the video column, and that a table contains video columns of diverse length. If the video column contains videos that greatly vary in length, then the optimizer must use average statistics or default to an execution strategy. The following sample query includes multiple UDFs.

SELECT*FROM PatientTable WHERE UDF1(a1) AND UDF2(a2) and UDF3(a3) AND UDF4(a4);

The following Table 1 provides an indication of the selectivity, execution time, and resource usage for each of the UDFs in the above query:

TABLE 1

| UDF Name | SELECTIVITY (% Rows Accepted) | EXECUTION TIME (Scale: 1 to 100) (1->Low; 100->High) | RESOURCE USAGE (Scale: 1 to 100) (1->Low; 100->High) |
| --- | --- | --- | --- |
| UDF1 | 50% | 50 | 30 |
| UDF2 | 10% | 90 | 10 |
| UDF3 | 40 | 60 | 70 |
| UDF4 | 90% | 10 | 50 |

UDF4() has high 90% selectivity (e.g., on average only 10% of tuples are not satisfied) and low execution time (mainly CPU) cost. Hence, for fast response time UDF4() should be executed first. UDF2() has low selectivity and high CPU cost and should be executed last. Using this criteria, UDF1() should be executed before UDF3(). Therefore, the order of UDF execution should be: UDF4(), UDF1(), UDF3() and UDF2(). For the sample query above containing multiple UDFs (i.e., UDF1, UDF2, UDF3, and UDF4), the optimizer determined that UDF4 would be executed first. However, if a "knowledgeable" user knows of an improved execution order, the pragma facility 118 enables the user to specify the order of execution. The following sample query indicates a pragma directive for ordering execution of UDFs:

SELECT*FROM PatientTable WHERE UDF1(a1) AND UDF2(a2) and UDF3(a3) AND UDF4(a4) [PRAGMA: UDF EXECUTION ORDER=UDF1, UDF3, UDF4, UDF2];

For a two pass paradigm, the pragma facility enables a user to specify whether an object is to be retrieved in the first pass, the second pass, or both; whether objects are to be retrieved based on some decision (e.g., the size of the object); whether projection UDF execution is to be performed in the first pass or the second pass.

For example, a user can use the pragma facility 118 to specify that an object is to be retrieved on the first pass when the object size is less than 30K, else the object is to be retrieved on the second pass.

The pragma facility 118 enables a user to specify either "retrieve immediate" or "two-pass" to determine whether or not to retrieve an object in the first pass or second pass. The following sample query indicates a pragma directive that overrides the default "retrieve immediate" (i.e., one-pass paradigm):

> SELECT LateralView (MRI) FROM PatientTable WHERE Find-Tumor (MRI)>0.8 [PRAGMA: LateralView (MRI)=Pass(2)];

Moreover, for projection UDF execution, typically, in the first pass, predicate UDFs are evaluated. However, the pragma facility 118 enables a user to delay the execution to the second pass. Similarly, transformation UDF evaluation can be delayed to the second pass. The following sample query includes a projection UDF:

> SELECT LateralView (MRI) FROM PatientTable WHERE Find-Tumor (MPJ)>0.8;

Performance can be optimized in the above query by delaying the execution of the UDF LateralView() until the second pass. For example, if a query returns "n rows" and a user views "k rows", then delaying the projection UDF saves "n–k" invocations of the projection UDF. This execution and resource usage is significant if "n" is much greater than "k".

Additionally, the pragma facility offers the following sub-options for executing a projection UDF (i.e., a UDF invocation with an ADT object being manipulated and retrieved):

> Pass(1): Execute UDF in Pass(1): retrieve object in either Pass(1), Pass(2), or both
>
> Pass(2): Execute UDF in Pass(2): retrieve object in either Pass(1), Pass(2), or both Another optimization issue concerns multiple ADT parameters in a UDF invocation. An optimization should minimize or eliminate large ADT data movement or remote object access. The following is a sample query that contains a UDF with multiple ADT parameters:

> SELECT*FROM surgery WHERE UDF5 (ADT1, ADT2);

Assume that the ADT1 and ADT2 objects that are parameters for UDF5 are stored on different computers. For this case, the optimizer can generate two different plans. In one plan, a query plan is generated in which the location of the computer on which the UDF is to be executed is determined at compile-time, such that execution always occurs on a particular computer (i.e., based on static average ADT size information). For example, if the average size of ADT1 is greater than the average size of ADT2, then UDF5 is executed at the computer on which ADT1 is stored. In the second plan, a query plan is generated in which the location of the computer on which the UDF is to be executed is determined at run-time. To determine the computer at run-time requires obtaining object sizes and migrating processing to the pertinent computer.

For UDFs with multiple ADT parameters, the default execution option is to execute the UDF at the computer with the largest ADT object and to access the other objects remotely. For example, as discussed above with reference to the sample query with a UDF with multiple ADT parameters, if ADT1 objects on average are larger than ADT2 objects, then UDF5 will normally execute at the computer where the ADT1 object resides. The pragma facility 118 enables a user to determine the location of the execution of the UDF. The following sample query indicates a pragma directive for determining the location for execution of a UDF:

> SELECT*FROM surgery WHERE UDF5 (ADT1, ADT2) [PRAGMA: Execute {UDF5, @ADT2}];

A UDF typically updates an ADT object value by making a copy of the ADT to avoid data integrity problems. A UDF in an SQL3 UPDATE command potentially will display special behavior that would allow updating in-place (i.e., without making a copy) and still avoiding data integrity problems. In this special case, a UDF can update an ADT object without having to make a copy of the object. The pragma facility 118 enables a user to specify "update-in-place" based on UDF internal semantic knowledge. Otherwise, a copy of the object is made during the update. An example of an update-in-place UDF is an append UDF where values are always written to the end of the object, as shown in the sample query below:

> UPDATE TimeSeries SET StockHistory=AppendValues UDF (StockHistory, Price, Time);

When a user knows that a copy of an ADT is not necessary when updating, the pragma facility 118 enables the user to indicate that it is safe to update in place. The following sample query indicates a pragma directive for indicating that update in place is to be done:

> UPDATE TimeSeries SET StockHistory=TS_UDF (StockHistory, Price, Time) [PRAGMA: UPDATE UDF IN PLACE=TS_UDF];

An optimal plan is determined by collecting statistical information for UDFs that operate on objects that have large variance with respect to execution time and/or storage resources. For example, the average statistics for time or space is important. If UDF(a1) takes time "t1" with resources "r1" to execute, and the same UDF(a2) takes time "t2" with resources "r2", then if the differences between the two time and resources values is great, this statistic is relevant to determining an optimal plan. The pragma facility 118 enables a user to override the plan determined by using these statistics.

Although many of the examples provided herein have used a SELECT, one skilled in the art would recognize that the pragma facility could also enable a user to override default execution options for other statements, such as INSERT. The following sample query includes an INSERT, which loads objects into the database:

> INSERT tb1 VALUES (UDF(adt));

Also, the pragma facility 118 enables a user to provide an indication that data is to be streamed to one or more clients. The pragma facility 118 also enables a user to provide hints on buffering and network usage that would optimize execution of a query.

Figure 12:
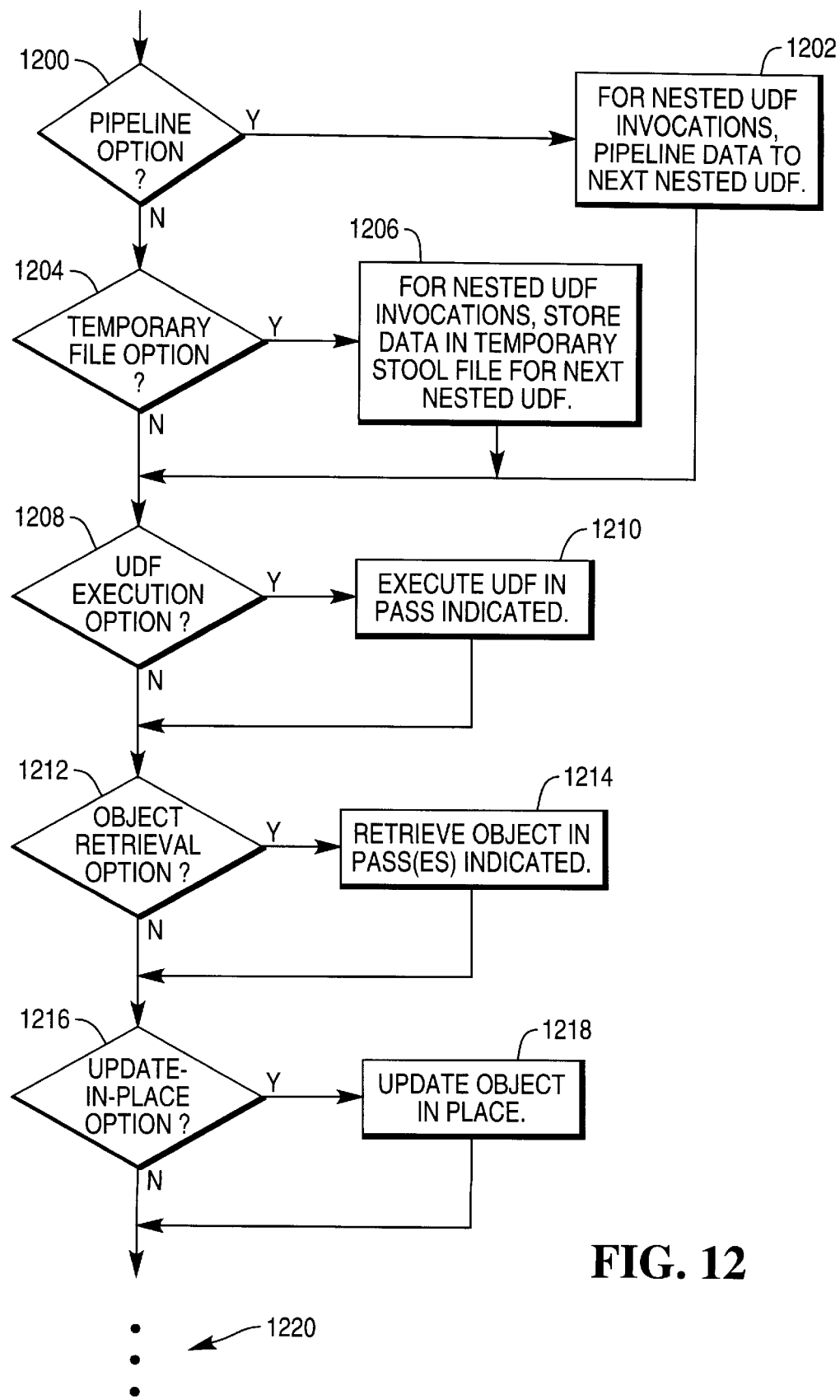
FIG. 12 is a flow diagram illustrating the steps performed by the pragma facility.

FIG. 12 is a flow diagram illustrating the steps performed by the pragma facility 118. The pragma facility 118 receives "hints" from a user to override default execution options. In Block 1200, the pragma facility 118 determines whether the pipeline option was selected. If the pipeline option was selected, the pragma facility 118 continues to Block 1202, otherwise the pragma facility 118 continues to Block 1204. In Block 1202, for nested UDF invocations, the pragma facility 118 pipelines data to the next nested UDF. In Block 1204, the pragma facility 118 determines whether the temporary file option was selected. If the temporary file option was selected, the pragma facility 118 continues to Block 1206, otherwise, the pragma facility 118 continues to Block 1208. In Block 1210, for nested UDF invocations, the pragma facility 118 stores data in temporary stool files for the next nested UDF.

In Block 1208, the pragma facility 118 determines whether the UDF execution option was selected. If the UDF execution option was selected, the pragma facility 118 continues to Block 1214, otherwise, the pragma facility 118 continues to Block 1212. In Block 1210, the pragma facility 118 executes a UDF in the pass indicated (i.e., the first pass or the second pass). In Block 1212, the pragma facility 118 determines whether the object retrieval option was selected. When the object retrieval option is selected, the pragma facility 118 continues to Block 1214, otherwise, the pragma facility 118 continues to Block 1216. In Block 1214, the pragma facility 118 retrieves an object in the pass(es) indicated (i.e., the first pass, the second pass, or both).

In Block 1216, the pragma facility 118 determines whether the update-in-place option was selected. If the update-in-place option was selected, the pragma facility 118 continues to Block 1218, otherwise, the pragma facility 118 continues to Block 1220. In Block 1218, the pragma facility 118 updates an object in place. In Block 1220, the ellipses represent other options that a user may select. The pragma facility 118 processes each of these similarly to processing the above-discussed options.

Conclusion

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of executing a query comprising user defined functions and abstract data type parameters in a computer to retrieve data from a database, the method comprising the steps of:

receiving optimization information from a user; and optimizing the execution of the query based on the received optimization information for execution within a massively parallel, shared nothing architecture, wherein the optimization information specifies that it is safe to update in place.

2. The method of claim 1 above, wherein the optimization information specifies whether data is to be streamed to a client.

3. A method of executing a query comprising user defined functions and abstract data type parameters in a computer to retrieve data from a database, the method comprising the steps of:

receiving optimization information from a user; and optimizing the execution of the query based on the received optimization information for execution within a massively parallel, shared nothing architecture, wherein the optimization information specifies that a user-defined function is to be executed in a first pass of a two-pass execution.

4. A method of executing a query comprising user defined functions and abstract data type parameters in a computer to retrieve data from a database, the method comprising the steps of:

receiving optimization information from a user; and optimizing the execution of the query based on the received optimization information for execution within a massively parallel, shared nothing architecture, wherein the optimization information specifies that a user-defined function is to be executed in a second pass of a two-pass execution.

5. A method of executing a query comprising user defined functions and abstract data type parameters in a computer to retrieve data from a database, the method comprising the steps of:

receiving optimization information from a user; and optimizing the execution of the query based on the received optimization information for execution within a massively parallel, shared nothing architecture, wherein the optimization information specifies at least one pass of a two-pass execution in which to retrieve an object.

6. An apparatus for executing a query comprising user defined functions and abstract data type parameters, comprising:

a computer having a data storage device connected thereto, wherein the data storage device stores a database; and one or more computer programs, performed by the computer, for receiving optimization information from a user and for optimizing the execution of the query based on the received optimization information, wherein the optimization information specifies that it is safe to update in place.

7. The apparatus of claim 6, wherein the optimization information specifies whether data is to be streamed to a client.

8. An apparatus for executing a query comprising user defined functions and abstract data type parameters, comprising:

a computer having a data storage device connected thereto, wherein the data storage device stores a database; and one or more computer programs, performed by the computer, for receiving optimization information from a user and for optimizing the execution of the query based on the received optimization information wherein the optimization information specifies that a user-defined function is to be executed in a first pass of a two-pass execution.

9. An apparatus for executing a query comprising user defined functions and abstract data type parameters, comprising:

a computer having a data storage device connected thereto, wherein the data storage device stores a database; and one or more computer programs, performed by the computer, for receiving optimization information from a user and for optimizing the execution of the query based on the received optimization information wherein the optimization information specifies that a user-defined function is to be executed in a second pass of a two-pass execution.

10. An apparatus for executing a query comprising user defined functions and abstract data type parameters, comprising:

a computer having a data storage device connected thereto, wherein the data storage device stores a database; and one or more computer programs, performed by the computer, for receiving optimization information from a user and for optimizing the execution of the query based on the received optimization information, wherein the optimization information specifies at least one pass of a two-pass execution in which to retrieve an object.

11. An article of manufacture comprising a computer program carrier readable by a computer and embodying one or more instructions executable by the computer to perform method steps for executing a query comprising a user defined function, the query being performed by the computer to retrieve data from a database stored in a data storage device connected to the computer, the method comprising the steps of:

receiving optimization information from a user; and optimizing the execution of the query based on the received optimization information, wherein the optimization information specifies that it is safe to update in place.

12. The method of claim 11, wherein the optimization information specifies whether data is to be streamed to a client.

13. An article of manufacture comprising a computer program carrier readable by a computer and embodying one or more instructions executable by the computer to perform method steps for executing a query comprising a user defined function, the query being performed by the computer to retrieve data from a database stored in a data storage device connected to the computer, the method comprising the steps of:

receiving optimization information from a user; and optimizing the execution of the query based on the received optimization information, wherein the optimization information specifies that a user-defined function is to be executed in a first pass of a two-pass execution.

14. An article of manufacture comprising a computer program carrier readable by a computer and embodying one or more instructions executable by the computer to perform method steps for executing a query comprising a user defined function, the query being performed by the computer to retrieve data from a database stored in a data storage device connected to the computer, the method comprising the steps of:

receiving optimization information from a user; and optimizing the execution of the query based on the received optimization information, wherein the optimization information specifies that a user-defined function is to be executed in a second pass of a two-pass execution.

15. An article of manufacture comprising a computer program carrier readable by a computer and embodying one or more instructions executable by the computer to perform method steps for executing a query comprising a user defined function, the query being performed by the computer to retrieve data from a database stored in a data storage device connected to the computer, the method comprising the steps of:

receiving optimization information from a user; and optimizing the execution of the query based on the received optimization information, wherein the optimization information specifies at least one pass of a two-pass execution in which to retrieve an object.

* * * * *